(12) United States Patent
Siegert et al.

(10) Patent No.: US 7,869,335 B2
(45) Date of Patent: Jan. 11, 2011

(54) MULTIPLE FERROELECTRIC FILMS

(75) Inventors: Markus Jan Peter Siegert, Pittsburgh, PA (US); Andreas Karl Roelofs, Pittsburgh, PA (US); Martin Gerard Forrester, Murrysville, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 507 days.

(21) Appl. No.: 11/869,037

(22) Filed: Oct. 9, 2007

(65) Prior Publication Data

US 2009/0092032 A1 Apr. 9, 2009

(51) Int. Cl.
*G11B 7/00* (2006.01)

(52) U.S. Cl. ....................... 369/126; 977/947
(58) Field of Classification Search ........................ None
See application file for complete search history.

(56) References Cited

U.S. PATENT DOCUMENTS

| | | | |
|---|---|---|---|
| 5,206,788 A * | 4/1993 | Larson et al. | 361/313 |
| 5,293,510 A * | 3/1994 | Takenaka | 257/295 |
| 5,348,811 A | 9/1994 | Nagao et al. | |
| 5,402,410 A | 3/1995 | Yoshimura et al. | |
| 5,583,727 A | 12/1996 | Parkin | |
| 5,585,986 A | 12/1996 | Parkin | |
| 5,761,188 A | 6/1998 | Rosen et al. | |
| 5,986,724 A * | 11/1999 | Akiyama et al. | 349/41 |
| 6,043,947 A | 3/2000 | Gooch et al. | |
| 6,627,930 B1 * | 9/2003 | Fox et al. | 257/295 |
| 6,801,348 B2 | 10/2004 | Ramapujam et al. | |
| 7,292,768 B1 * | 11/2007 | Kalinin et al. | 385/147 |
| 7,626,846 B2 * | 12/2009 | Rao et al. | 365/145 |
| 2001/0054748 A1 * | 12/2001 | Wikborg et al. | 257/595 |
| 2003/0174531 A1 * | 9/2003 | Zambrano | 365/145 |
| 2005/0128616 A1 | 6/2005 | Johns et al. | |
| 2006/0023606 A1 | 2/2006 | Lutwyche et al. | |

OTHER PUBLICATIONS

S. Yokoyama et al., "Compositional Dependence of Electrical Properties of Highly (100)-/(001)-Oriented Pb(Zr,Ti)O$_3$ Thick Films Prepared on Si Substrates by Metalorganic Chemical Vapor Deposition", *Jpn. J. Appl. Phys.*, vol. 42, Part 1, No. 9B, Sep. 2003, pp. 5922-5926.

* cited by examiner

*Primary Examiner*—Peter Vincent Agustin
(74) *Attorney, Agent, or Firm*—Benjamin T. Queen, II; Pietragallo Gordon Alfano Bosick & Raspanti, LLP

(57) ABSTRACT

An apparatus includes a first ferroelectric storage layer and a second ferroelectric storage layer adjacent the first ferroelectric storage layer. A coupling layer may be between the first ferroelectric storage layer and the second ferroelectric storage layer. The ferroelectric storage layers may be configured as a data storage medium for use in a data storage system. A related method is also disclosed.

22 Claims, 3 Drawing Sheets

MULTIPLE FERROELECTRIC FILMS

BACKGROUND

Ferroelectric materials can form the basis for data storage wherein binary "1" and "0" levels are represented by the electric polarization of a ferroelectric film pointing "up" or "down". A data storage device that utilizes, for example, a ferroelectric storage medium can include an electrode, which also may be referred to as a "tip" or "probe tip", that is movable relative to the storage medium. The storage medium may include a substrate, an electrode layer and a ferroelectric storage layer. In both cases the binary "1" and "0" are stored by causing the polarization of the ferroelectric film to point "up" or "down" in a spatially small region or domain local to the electrode. Data can then be read out destructively by applying a voltage of a magnitude and polarity such as to cause the polarization to point "up". The domains polarized "down" (e.g. representing "0"), will then switch to the "up" state, and a charge will flow which is proportional to the remnant polarization of the ferroelectric. Domains polarized "up" will have no such current flow. The presence or absence of this current flow, as determined by a sense amplifier, can then be used to determine whether the domain had contained a "1" or "0".

Data storage devices are being proposed to provide smaller size, higher capacity, and lower cost data storage devices. Data storage devices usually store one bit at one location of the device. In order to increase the capacity of the device, it is necessary to decrease the bit size. However, there are several technological and fundamental limitations to overcome to decrease the bit size such as, for example, amplification of readout signal and stability of the bits.

SUMMARY

An aspect of the present invention is to provide an apparatus including a first ferroelectric storage layer and a second ferroelectric storage layer adjacent the first ferroelectric storage layer.

A further aspect of the present invention is to provide a system including a transducer and a storage medium adjacent the transducer. The storage medium includes a first ferroelectric storage layer and a second ferroelectric storage layer adjacent the first ferroelectric storage layer.

An additional aspect of the present invention is to provide a method including: providing a first ferroelectric storage layer and a second ferroelectric storage layer; applying a first switching voltage (i) to switch the polarization of individual storage domains of the first ferroelectric storage layer and (ii) to switch the polarization of individual storage domains of the second ferroelectric storage layer; and applying a second switching voltage (i) to switch the polarization of the individual storage domains of the first ferroelectric storage layer or (ii) to switch the polarization of the individual storage domains of the second ferroelectric storage layer. The method also may include providing a coupling layer between the first ferroelectric storage layer and the second ferroelectric storage layer.

These and various other features and advantages will be apparent from a reading of the following detailed description.

DRAWINGS

DETAILED DESCRIPTION

The invention relates generally to ferroelectric films. In one aspect, the invention relates to ferroelectric films that may be used in data storage devices. In another aspect, the invention relates to ferroelectric films that may be used in a data storage medium such as, for example, a ferroelectric probe storage medium. However, it will be appreciated that the invention may also have utility in other types of data storage devices or devices used for purposes other than data storage.

Figure 1:
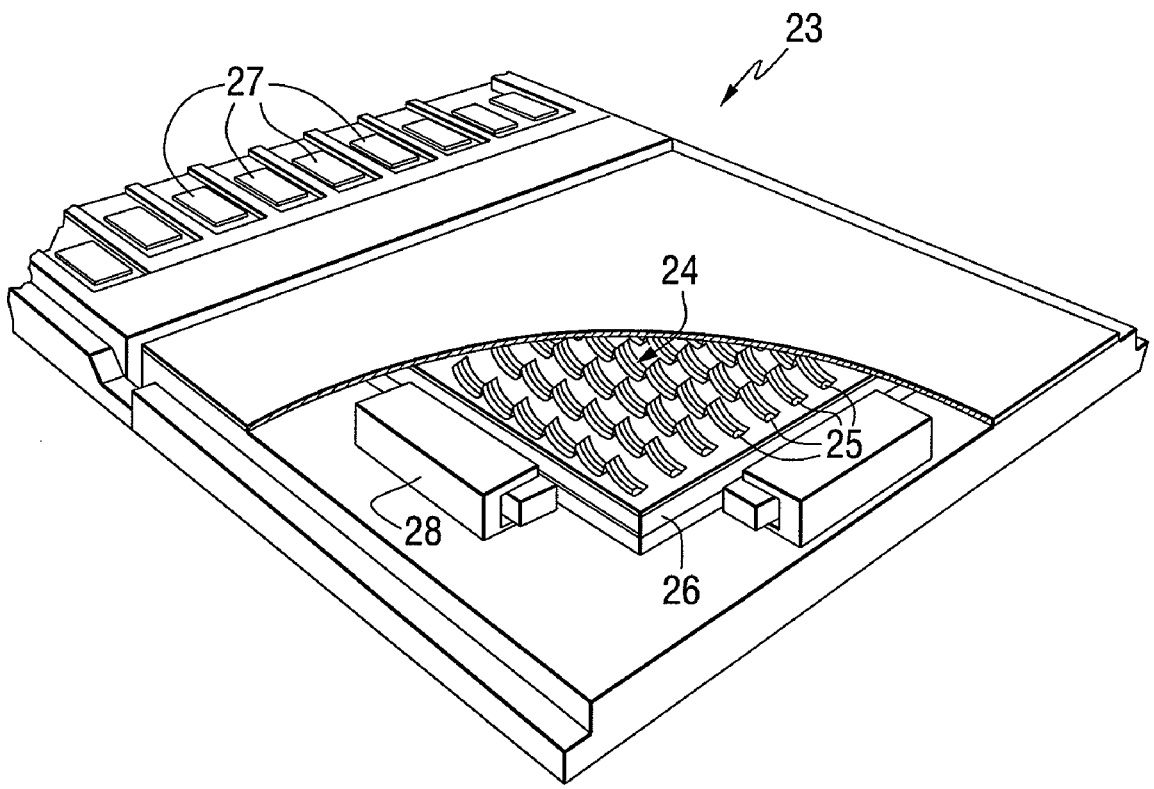
FIG. 1 is a perspective view of a data storage system, according to one aspect of the present invention.

FIG. 1 is a perspective view of a data storage system 23 that illustrates an implementation of an example storage system constructed in accordance with the present invention. In the storage system 23, an array 24 of probes or electrodes 25 is positioned adjacent to a storage medium 26. The array 24 of electrodes 25 and the medium 26 are planar and extend generally parallel with each other. The electrodes 25 are each operably coupled to connectors 27. The storage medium 26 is coupled to at least one actuator 28 that is configured to move the medium 26 relative to the electrodes 25. This movement causes the electrodes 25 to be moved relative to the individual storage domains of medium 26.

Figure 2:
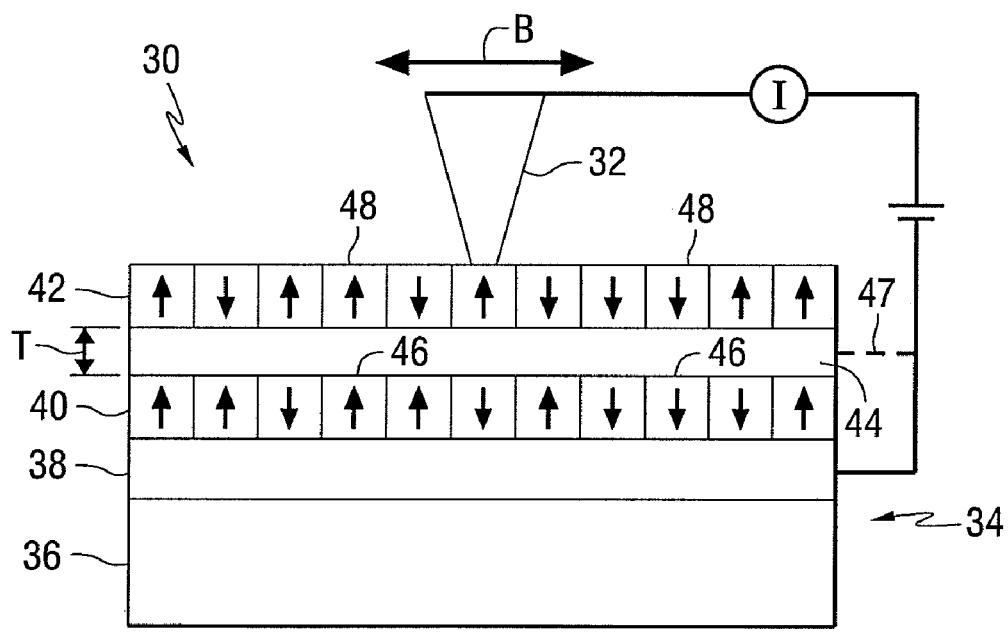
FIG. 2 is a schematic illustration of a data storage device, according to one aspect of the present invention.

FIG. 2 illustrates a data storage device 30 constructed in accordance with the invention. The data storage device 30, which may be, for example a probe or ferroelectric data storage device, includes an electrode 32 that is moveable as indicated by arrow B relative to a data storage medium 34. The storage medium 34 may be, for example, a ferroelectric storage medium. The medium 34 may include a substrate 36 having an electrode layer 38 formed thereon. A first ferroelectric storage layer 40 is formed on or adjacent the electrode layer 38. The medium 34 also includes a second ferroelectric storage layer 42 that may be spaced apart from the first ferroelectric storage layer 40 by a coupling layer 44. Thus, it will be appreciated that the medium 34 of the present invention provides multiple ferroelectric storage layers 40 and 42. Each storage layer 40 and 42 includes a plurality of regions or domains 46 and 48, respectively, where data is stored by causing the polarization of the ferroelectric domains to point "up" or "down" wherein each up or down represents a binary "1" and "0".

The substrate 36 may be formed of, for example, silicon, sapphire, strontium titanate or magnesium oxide. The electrode layer 38 may be formed of a conductive material such as, for example, platinum, lanthanum strontium copper oxide, or strontium ruthenate. The first ferroelectric storage layer 40 and the second ferroelectric storage layer 42 may be formed of a ferroelectric material such as, for example, barium titanate, lead titanate, lead zirconium titanate or bismuth ferrite.

In one aspect of the invention, the coupling layer 44 may be a dielectric coupling layer formed of, for example, a dielectric material such as strontium titanate, magnesium oxide, silicon oxide, or hafnium oxide. The coupling layer 44 may have a thickness T (see FIG. 2) in the range of about 0 to about 100 nm, i.e. when T=0 there is no coupling layer 44 and the second storage layer 42 is deposited directly on top of the first storage layer 40.

In accordance with one aspect of the invention, the first ferroelectric storage layer 40 includes a ferroelectric property such as, for example, coercive field or dielectric constant, having a first value. The second ferroelectric storage layer 42 is provided with the same ferroelectric property having a second value. For example, the first ferroelectric storage layer 40 may have a coercive field of 60 kV/cm while the second ferroelectric storage layer 42 has a coercive field of 20 kV/cm. Advantageously, this example would allow for the polarization of the individual domains 48 of the second ferroelectric storage layer 42 to be switched by applying a voltage through the electrode 32 that generates a field of, for example, 30-40 kV/cm. Then by applying a higher voltage to generate a field of above, for example, 60 kV/cm the polarization of the individual domains 46 of the first ferroelectric storage layer 40 and the domains 48 of the second ferroelectric storage layer 42 could both be switched.

Figure 3A:
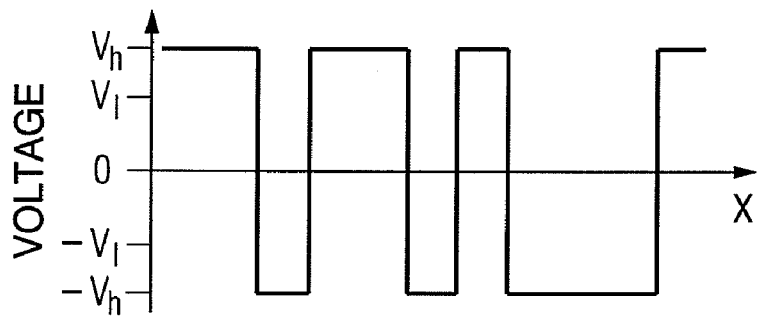
FIG. 3A is a voltage graph illustrating writing data, according to one aspect of the present invention.
Figure 3B:
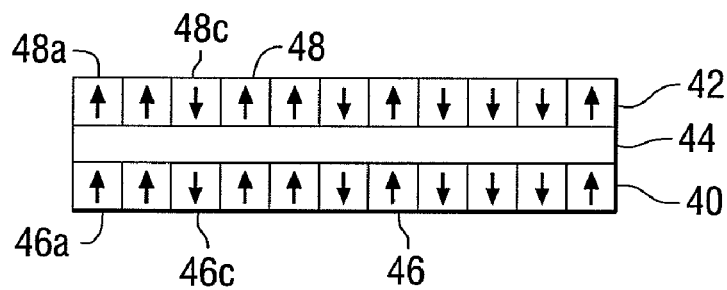
FIG. 3B is a partial schematic illustration of a storage medium corresponding to the voltage graph of FIG. 3A, according to one aspect of the present invention.

FIGS. 3A and 3B illustrate an example of writing data to both the first ferroelectric storage layer 40 and the second ferroelectric storage layer 42, i.e., switching the polarization of all the individual domains 46 and 48. In the example set forth in FIGS. 3A and 3B (as well as FIGS. 4A-6B) the storage layers 40 and 42 have, for example, different coercive field values as described hereinabove. By applying a higher alternating voltage $V_h$, data is written in both storage layers 40 and 42, i.e., adjacent domains 46 and 48 in the storage layers 40 and 42 are written to point in the same direction. For example, a +$V_h$ causes adjacent domains 46a and 48a to point in the up direction while a -$V_h$ causes adjacent domains 46c and 48c to point in the down direction.

Figure 4A:
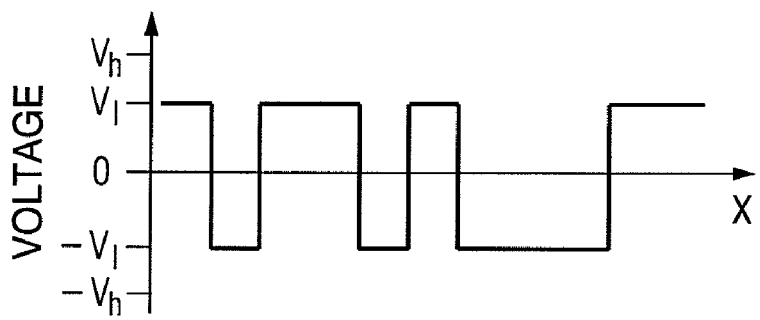
FIG. 4A is a voltage graph further illustrating writing data, according to one aspect of the present invention.
Figure 4B:
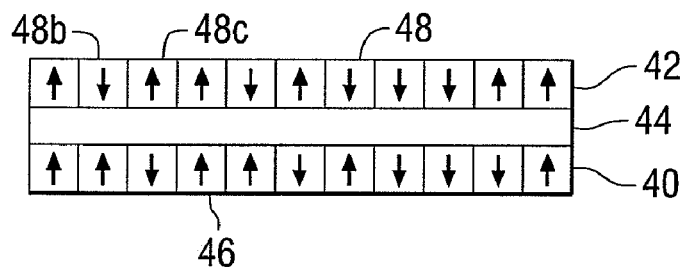
FIG. 4B is a partial schematic illustration of a storage medium corresponding to the voltage graph of FIG. 4A, according to one aspect of the present invention.

FIGS. 4A and 4B illustrate an example of writing data only in the second storage layer 42. By applying a lower alternating voltage $V_l$, data is written only to the second storage layer 42 that has a lower coercive field than the first storage layer 40. A +$V_l$ results in the domains 48 of the storage layer 42 pointing in the up direction (e.g. such as domain 48c) while a -$V_l$ results in the domains 48 of the storage layer 42 pointing in the down direction (e.g. such as domain 48b).

Figure 5A:
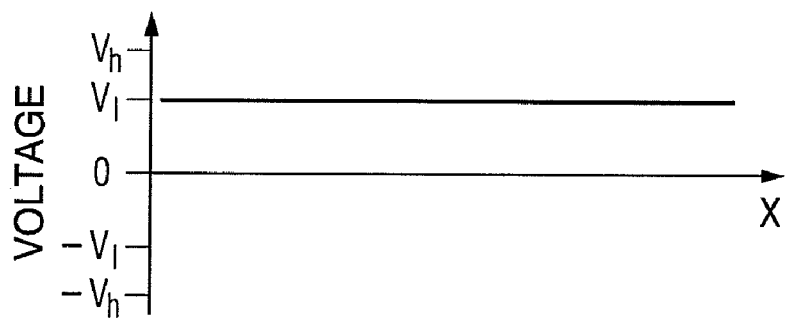
FIG. 5A is a voltage graph illustrating reading back data, according to one aspect of the present invention.
Figure 5B:
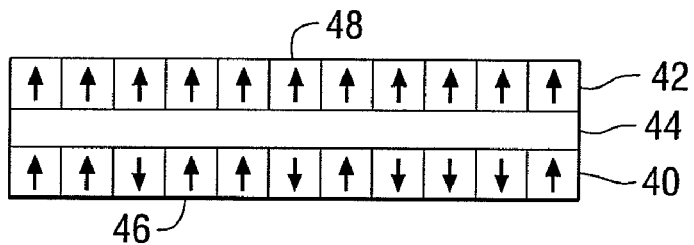
FIG. 5B is a partial schematic illustration of a storage medium corresponding to the voltage graph of FIG. 5A, according to one aspect of the present invention.

FIGS. 5A and 5B illustrate an example of readback for the data stored in the second ferroelectric storage layer 42 having the lower coercive field. The readback is done using an erase readback scheme that senses current flow during polarization reversal only, which is also referred to as "destructive" readback. Specifically, a constant lower voltage $V_l$ is applied to each of the domains 48 of the storage layer 42 while monitoring the switching current of the areas which have a different direction of polarization.

Figure 6A:
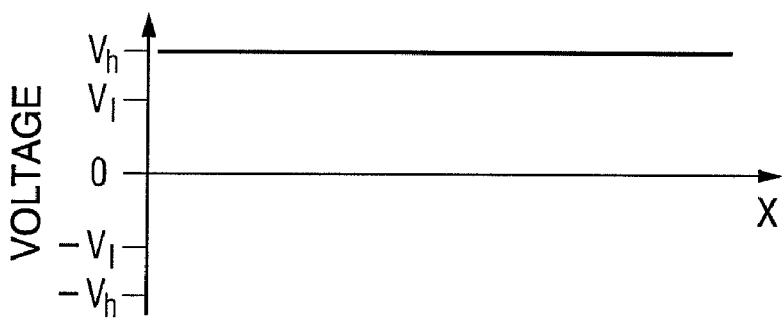
FIG. 6A is a voltage graph further illustrating reading back data, according to one aspect of the present invention.
Figure 6B:
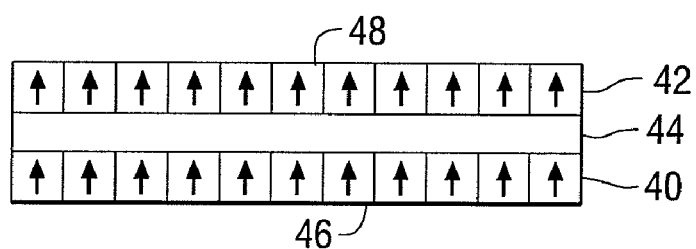
FIG. 6B is a partial schematic illustration of a storage medium corresponding to the voltage graph of FIG. 6A, according to one aspect of the present invention.

FIGS. 6A and 6B illustrate an example of readback for data in the first ferroelectric storage layer 40 having a higher coercive field than the second ferroelectric storage layer 42. Specifically, a constant higher voltage $V_h$ is applied to each of the individual domains 46 of the storage layer 40 while monitoring the switching current of the domains 46 that have a different direction of polarization.

In accordance with another aspect of the invention, the coupling layer 44 that is positioned between the first ferroelectric storage layer 40 and second ferroelectric storage layer 42 may be switchable from a dielectric coupling layer to an additional electrode layer, i.e. switched from a non-conductive state to a conductive state, and then may be switchable back to a dielectric coupling layer. For this aspect of the invention, the coupling layer 44 is connected to the voltage source, as indicated by dashed line 47 in FIG. 2, for the situation where the coupling layer is being used as an additional electrode layer. Also for this aspect of the invention, the ferroelectric properties for the storage layers 40 and 42 may be different (e.g. different coercive field values for storage layers 40 and 42) or the same (e.g. the same coercive field values for storage layers 40 and 42). A coupling layer 44 with switchable conductivity could be, for example, any suitable semi-conducting layer such as silicon, germanium or gallium arsenide. To change the conductivity in the coupling layer 44, the coupling layer could be irradiated with electromagnetic energy that is above the band gap of the semi-conducting material used to form the coupling layer 44. This would generate electron hole pairs in the material that would change the conductivity.

For the aspect of the invention described above having the switchable coupling layer 44, the writing and reading would happen in essentially the same manner as when the coupling layer 44 is always a dielectric coupling layer, as described in detail herein. For example, the coupling layer 44 would be switched to a non-conducting state and the same bit pattern would be written into both ferroelectric storage layers 40 and 42 at the same time. Next, the coupling layer 44 would be switched into the conductive state. Then when the electrode 32 is passing over, the write field would only penetrate to the second ferroelectric storage layer 42 that is on top of the now conductive coupling layer 44 and the first ferroelectric storage layer 40 below would be screened from the write field. Thus, the information would be written only to the second ferroelectric storage layer 42. It will be appreciated that the process of switching the coupling layer 44 from a non-conducting state to a conducting state and then writing to the top most storage layer could be repeated as many times as necessary if an additional coupling layer(s) and an additional storage layer(s) is provided. This would be repeated until the top most coupling layer has been switched into the conductive state and the information has been written into the top most ferroelectric storage layer. The read-out would essentially go in the opposite order. For example, the top most coupling layer 44 would be switched into the conductive state and the information would be read from the top most storage layer 42 and this would be repeated until all storage layers have been read.

Accordingly, it will be appreciated that the invention provides an improved apparatus that is capable of increased storage capacity by providing for a media to have two or more ferroelectric storage layers. It will also be appreciated that the invention provides an improved method, as described herein, for writing and/or reading data on a media having two or more ferroelectric storage layers.

The implementation described above and other implementations are within the scope of the following claims.

What is claimed is:

1. An apparatus, comprising:
   a first ferroelectric storage layer including first individual storage domains each having a polarization switchable by a first switching voltage; and
   a second ferroelectric storage layer adjacent said first ferroelectric storage layer and including second individual storage domains each having a polarization switchable by the first switching voltage, wherein the polarization of either the first individual storage domains or the second individual storage domains is switchable by a second switching voltage.

2. The apparatus of claim 1, wherein said first ferroelectric storage layer has a ferroelectric property having a first value and said second ferroelectric storage layer has said ferroelectric property with a second value.

3. The apparatus of claim 2, wherein said ferroelectric property is coercive field.

4. The apparatus of claim 2, wherein said ferroelectric property is dielectric constant.

5. The apparatus of claim 1, further comprising a coupling layer between said first ferroelectric storage layer and said second ferroelectric storage layer.

6. The apparatus of claim 5, wherein said coupling layer is a dielectric coupling layer or an electrode coupling layer.

7. The apparatus of claim 6, wherein said coupling layer is formed of silicon, germanium, or gallium arsenide.

8. A system, comprising:
a transducer; and
a storage medium adjacent said transducer, said storage medium comprising:
a first ferroelectric storage layer including a first individual storage domain; and
a second ferroelectric storage layer adjacent said first ferroelectric storage layer and including a second individual storage domain,
wherein the polarization of both the first individual storage domain and the second individual storage domain is switchable by a first switching voltage and the polarization of either the first individual storage domain or the second individual storage domain, but not both, is switchable by a second switching voltage.

9. The system of claim 8, wherein said first ferroelectric storage layer is formed on or adjacent an electrode layer.

10. The system of claim 8, wherein said first ferroelectric storage layer has a ferroelectric property having a first value and said second ferroelectric storage layer has said ferroelectric property with a second value.

11. The system of claim 8, further comprising a coupling layer between said first ferroelectric storage layer and said second ferroelectric storage layer.

12. The system of claim 8, further comprising a third ferroelectric storage layer adjacent said second ferroelectric storage layer.

13. The system of claim 8, wherein said transducer is a probe.

14. The system of claim 8, wherein said transducer is an electrode.

15. A method, comprising:
providing a first ferroelectric storage layer and a second ferroelectric storage layer;
applying a first switching voltage (i) to switch the polarization of individual storage domains of said first ferroelectric storage layer and (ii) to switch the polarization of individual storage domains of said second ferroelectric storage layer; and
applying a second switching voltage (i) to switch the polarization of the individual storage domains of said first ferroelectric storage layer or (ii) to switch the polarization of the individual storage domains of said second ferroelectric storage layer.

16. The method of claim 15, further comprising:
providing said first ferroelectric storage layer with a ferroelectric property having a first value; and
providing said second ferroelectric storage layer with said ferroelectric property having a second value.

17. The method of claim 16, wherein said ferroelectric property is coercive field or dielectric constant.

18. The method of claim 15, further comprising providing a coupling layer between said first ferroelectric storage layer and said second ferroelectric storage layer.

19. The method of claim 18, further comprising switching said coupling layer from a dielectric coupling layer to an electrode coupling layer.

20. The method of claim 19, further comprising switching said electrode coupling layer back to a dielectric coupling layer.

21. The method of claim 18, wherein said coupling layer is formed of silicon, germanium, or gallium arsenide.

22. The method of claim 15, further comprising sensing current flow during polarization reversal of (i) the individual domains of said first ferroelectric storage layer and (ii) the individual domains of said second ferroelectric storage layer to read the data stored in said first ferroelectric storage layer and said second ferroelectric storage layer.

* * * * *